UNITED STATES PATENT OFFICE.

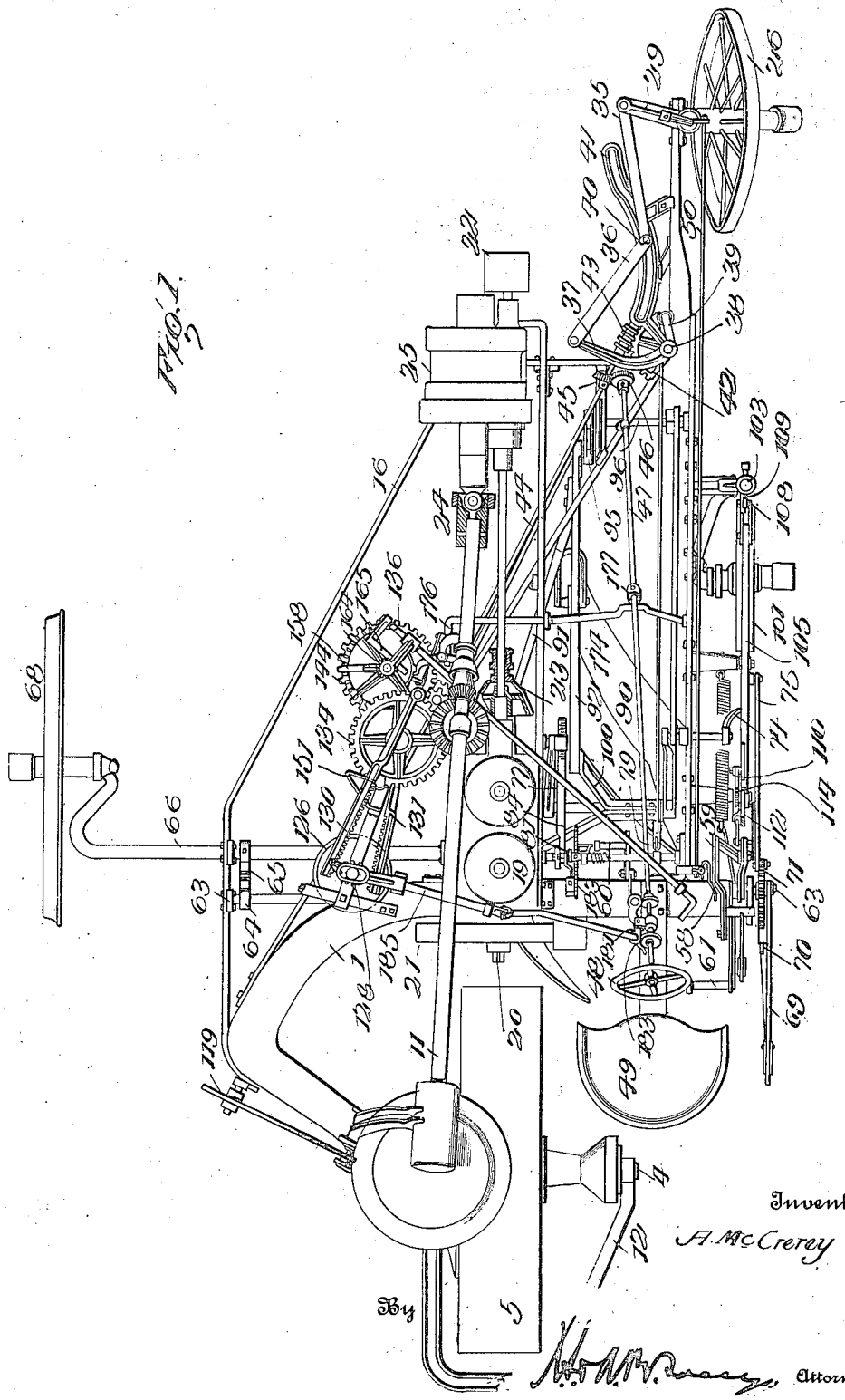

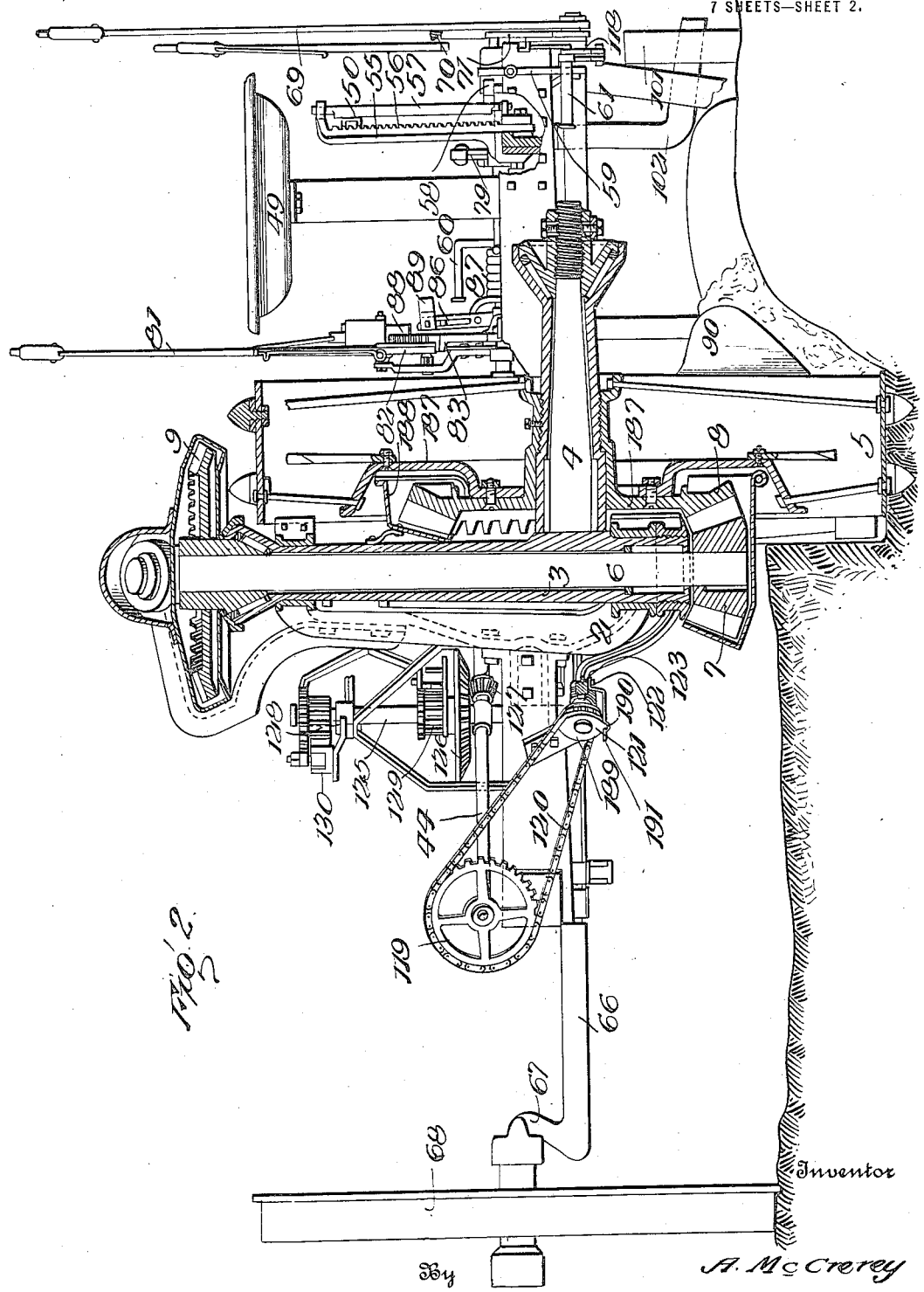

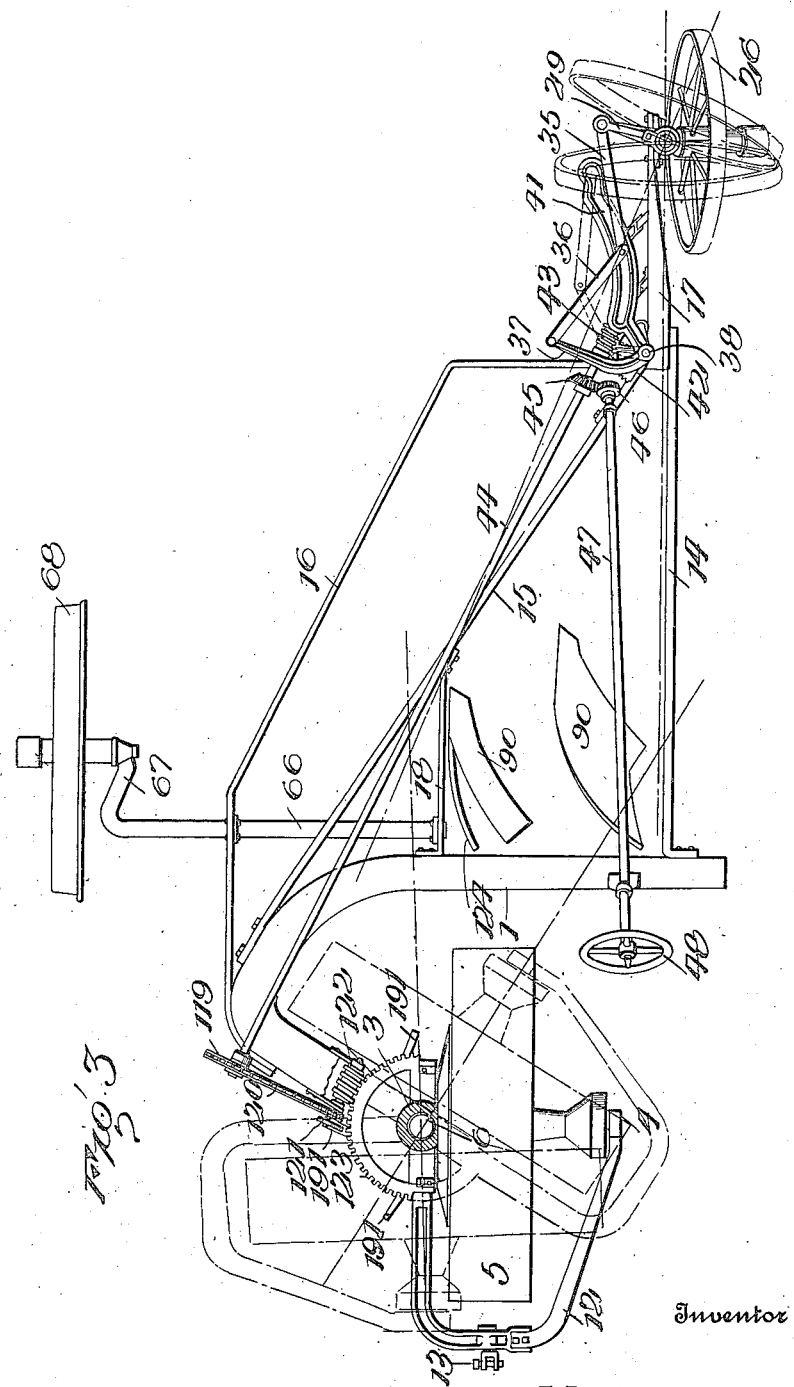

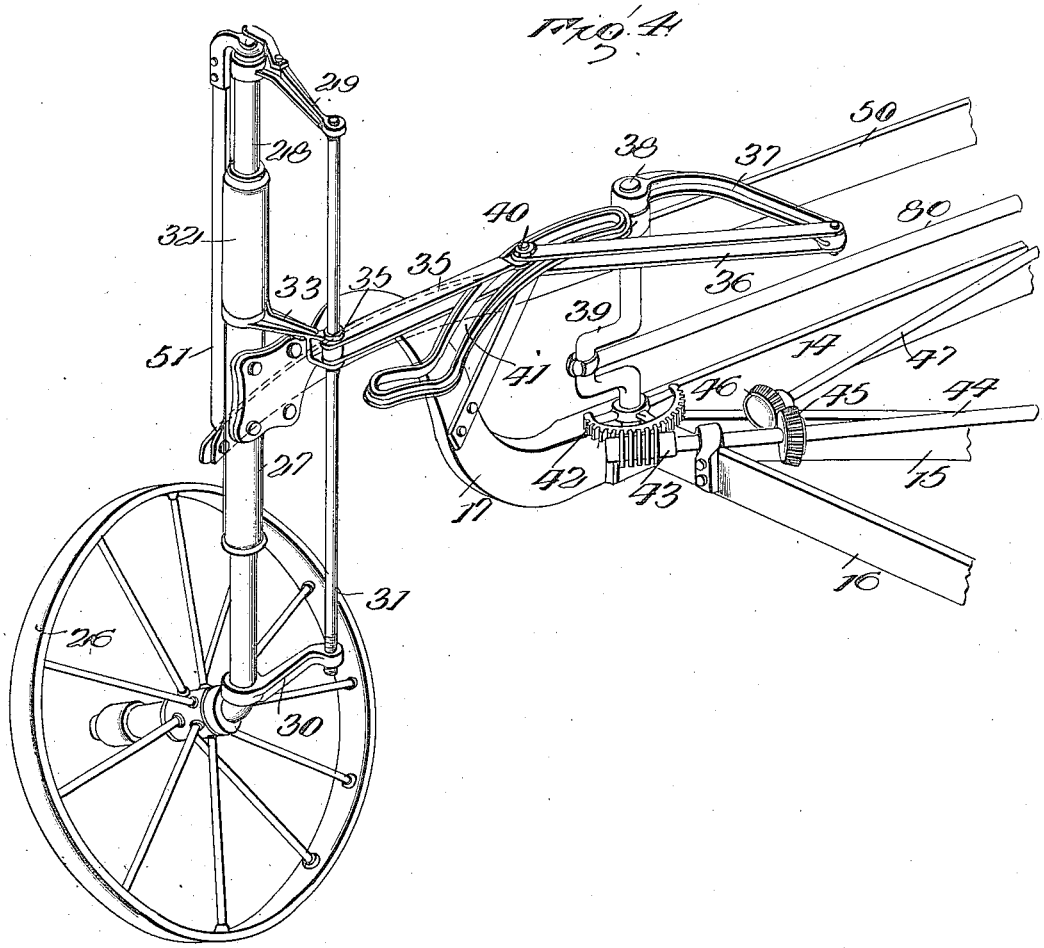

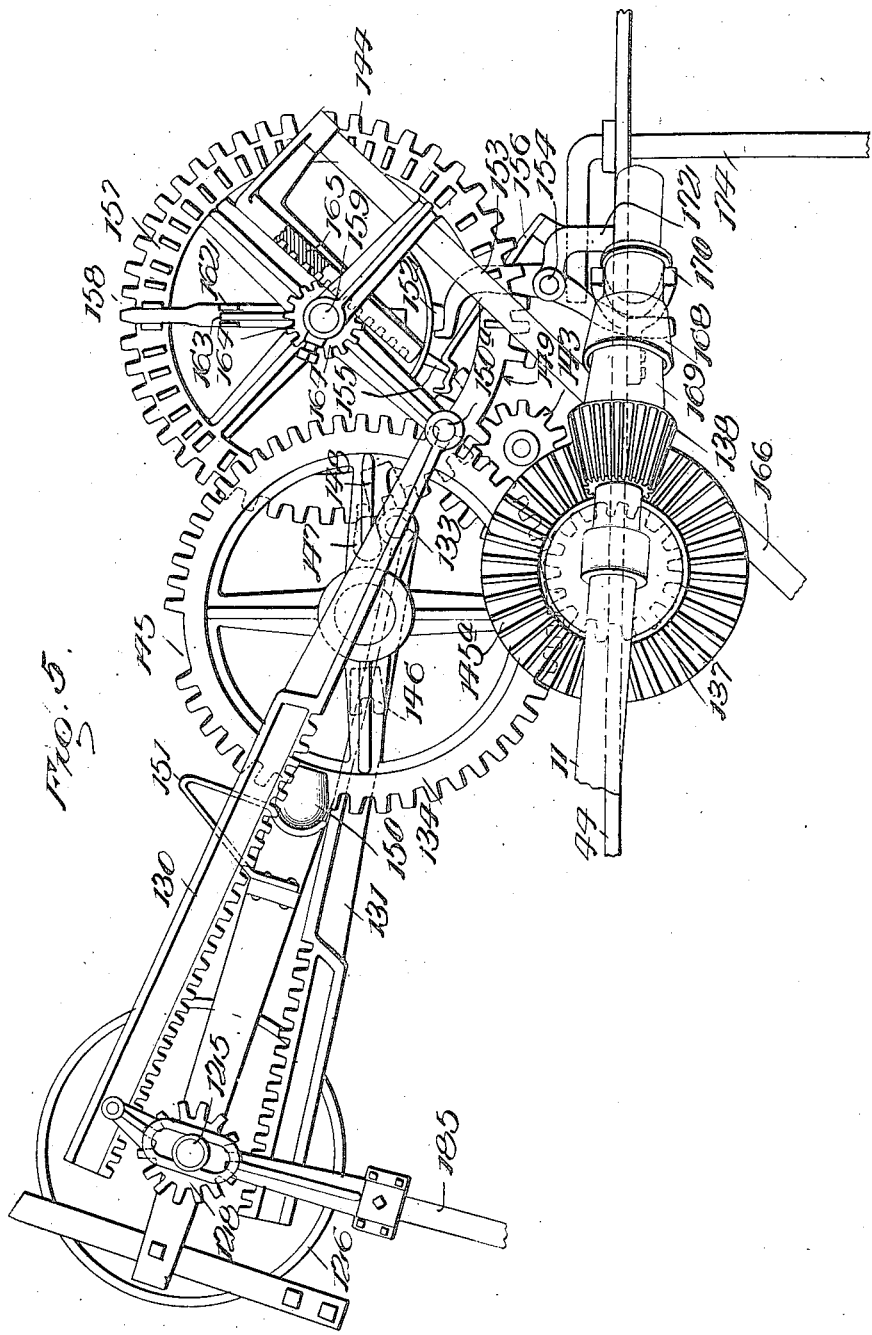

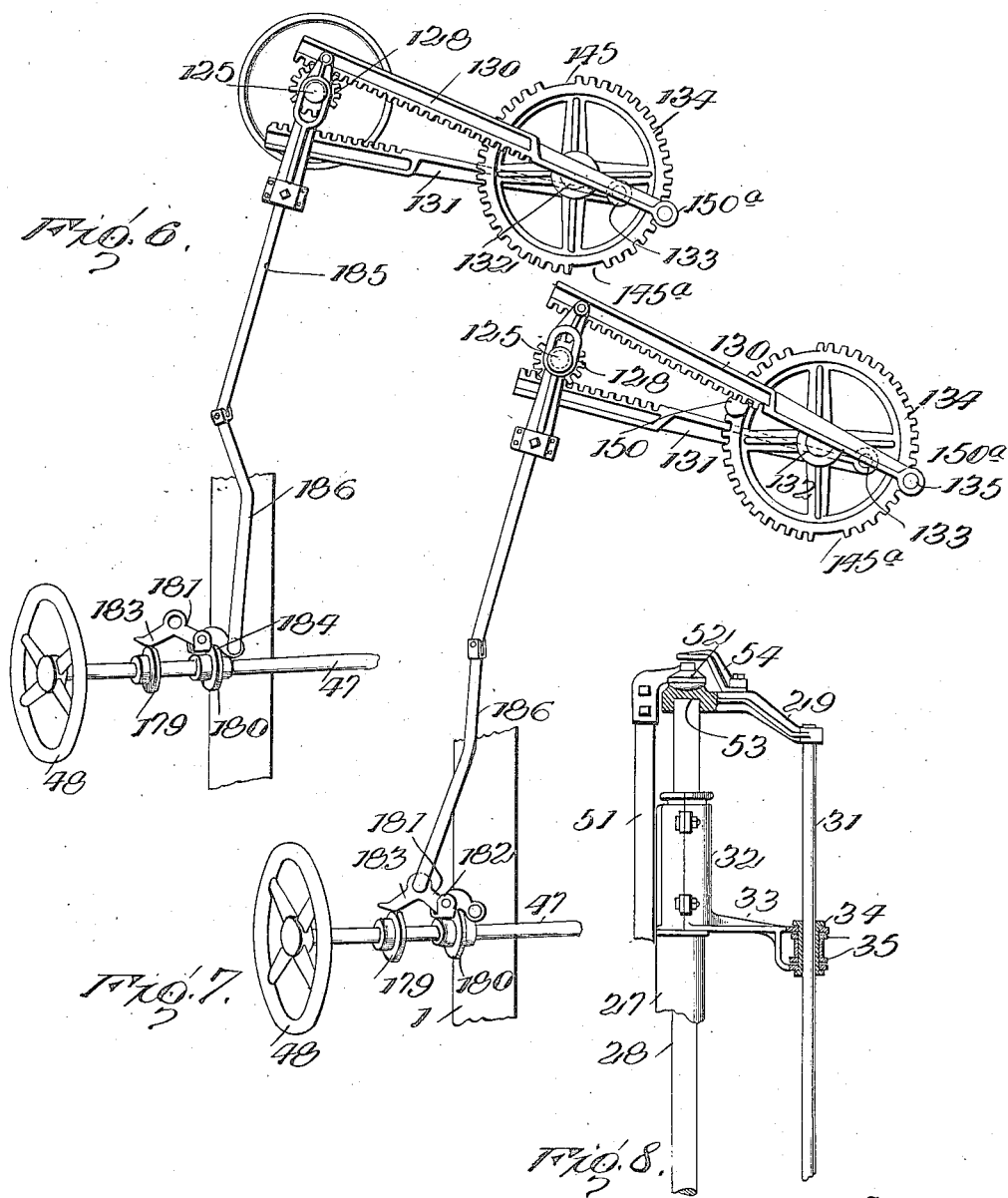

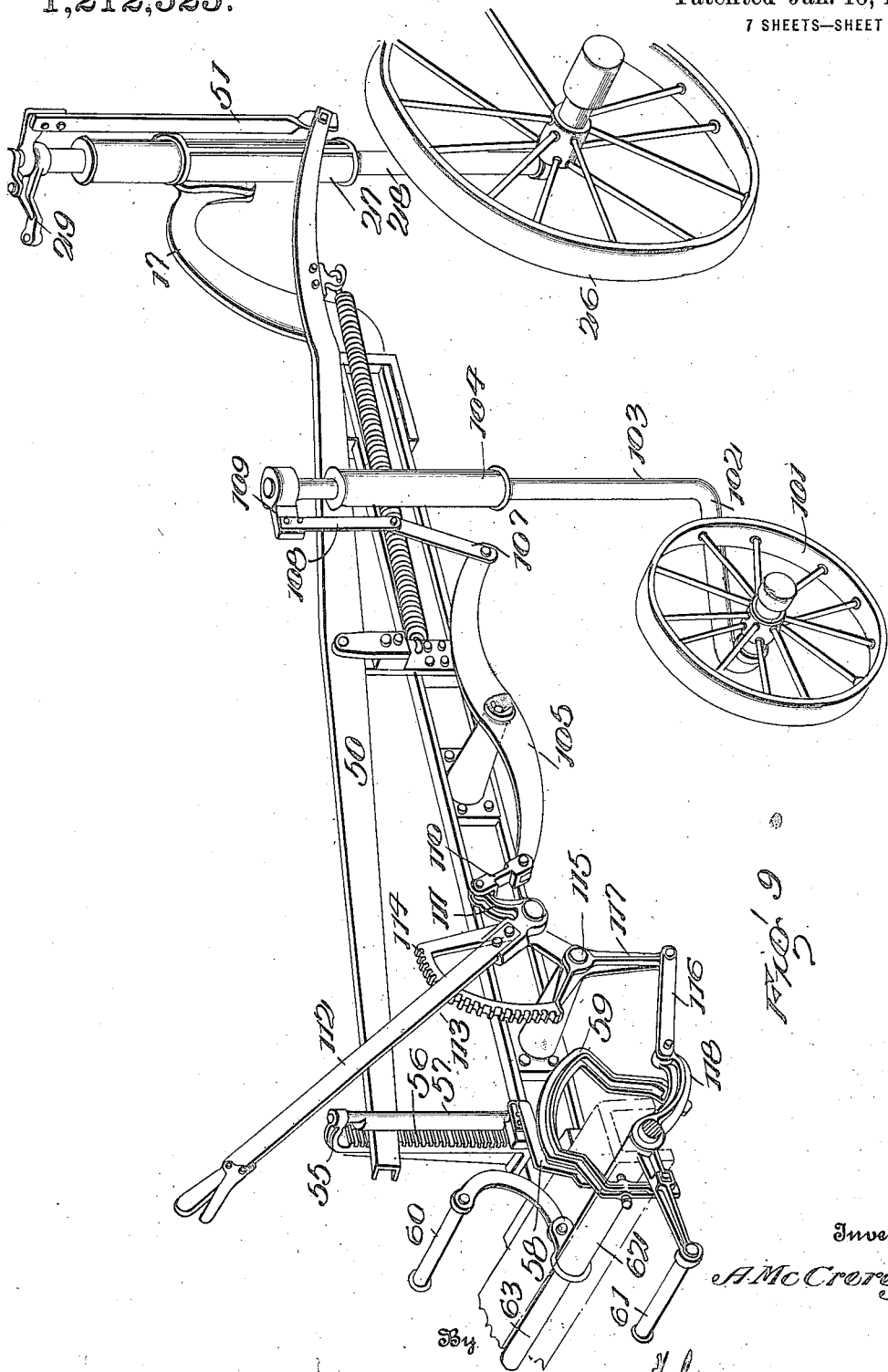

ALEXANDER McCREREY, OF HIAWATHA, KANSAS.

TRACTOR.

1,212,525. Specification of Letters Patent. Patented Jan. 16, 1917.

Application filed May 25, 1915. Serial No. 30,404.

*To all whom it may concern:*

Be it known that I, ALEXANDER McCREREY, a citizen of the United States, residing at Hiawatha, in the county of Brown and State of Kansas, have invented certain new and useful Improvements in Tractors, of which the following is a specification.

This invention has relation to machines which are self-propelled and adapted for use as a tractor or engine for operating any machinery to be driven.

The invention has for its object to provide a motor propelled implement in which the motive power may be utilized for steering, the degree of turning being determined by the operator in advance after which the steering wheels are turned to give proper direction to the implement and the steering mechanism then automatically returned to normal position.

The invention, furthermore, provides an implement which may be steered manually or directed in its travel by motive power derived from the engine provided for propelling the machine.

The invention also has for its object the provision of means under control of the operator to admit of setting the steering mechanism so as to turn the implement either to the right or to the left.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings:—Figure 1 is a top plan view; Fig. 2 is an enlarged rear view with the drive or bull wheel in section; Fig. 3 is a top plan view of the main frame and supporting wheels showing more clearly the operation of the front and rear wheels for steering; Fig. 4 is an enlarged perspective view of the front portion of the main frame and the front wheel and parts coöperating therewith; Fig. 5 is a detail plan view of the gearing forming part of the steering mechanism and showing the means for setting the same to regulate the degree of turning. Fig. 6 is a detail view of the means adapted to be operated by hand for throwing the power steering mechanism into gear for turning the machine in one direction; Fig. 7 is a view of the parts illustrated in Fig. 6 showing the relation of the same for turning the machine in the opposite direction; Fig. 8 is a detail view of a part of the supporting and adjusting mechanism for the front wheel; Fig. 9 is a detail perspective view of a portion of the main frame showing the front and gage wheels and means associated therewith for adjusting the same.

The main frame comprises a transversely disposed beam 1, which is substantially of J-form, the short member of such beam being bolted or attached in any manner to a vertically disposed bracket 2, indicated most clearly in Fig. 2 and which bracket is provided at its upper and lower ends with bearings in which is mounted a vertically disposed sleeve 3 provided near its lower end with a laterally extending spindle 4 upon which is mounted the drive or bull wheel 5. A vertically disposed shaft 6 is mounted in the sleeve 3 and a pinion 7 is secured to the lower end of said shaft to mesh with a gear wheel 8 attached to the side of the drive wheel 5. The gear elements 7 and 8 are of the bevel type although it is to be understood that gearing of any form may be employed which will admit of transmitting motion from the shaft 6 to the wheel 5. A gear wheel 9 is secured to the upper end of the shaft 6 and is in mesh with a companion gear on the rear end of a shaft 11 which is longitudinally disposed and inclines upwardly and rearwardly, said gear wheels being suitably housed so as to exclude foreign matter and prevent any part of the person or clothing coming in contact therewith, as also to retain a lubricant. A frame 12 of substantially U-form embraces the rear portion of the wheel 5 and is provided with a clevis 13 for conveniently hitching a wagon, implement or other device to the machine. One member of the frame 12 is connected in any manner to the sleeve 3 and the other member is inclined outwardly and forwardly and receives the outer end of the spindle 4. The frame 12 turns with the sleeve 3 and with the drive wheel 5. The main frame also comprises beams 14, 15 and 16. The beam 14 is longitudinally disposed whereas the beams 15 and 16 incline forwardly and laterally. A longitudinally disposed beam 17 having its front portion curved upwardly and forwardly is disposed with its rear end secured between the front ends of the beams 14, 15 and 16. A brace 18 connects the beam 15 with the beam 1 and supports the inner end of the shaft upon which the land wheel is mounted.

A motor 19 is mounted upon the main frame with its shaft 20 extending longitudinally of the same and provided with a fly wheel 21 and a pulley 22. The power shaft 20 is also provided with a clutch 23 of any type for throwing the engine into or out of gear as occasion may require. The shaft 11 is connected by means of a universal joint 24 with a shaft passing through a gear box 25 and connected by means of suitable gearing within said box with the motor shaft 20. It will thus be seen that power is transmitted from the motor through the shaft 11 to propel the machine over the field.

The front wheel 26 is mounted to turn about a vertical axis and is adjustable vertically in a bearing 27. A standard 28, extending through said bearing, is provided at its lower end with a laterally extending spindle upon which the wheel 26 is mounted and such standard is provided at its upper end with a lateral arm or crank 29 and at its lower end with an arm 30, the two arms being connected by a rod 31 which is parallel to the standard 28 and adjustable therewith. A sleeve 32 is mounted upon the bearing 27 and is free to turn thereon and preferably comprises two parts which are bolted together about the bearing. An arm 33 projects from the sleeve 32 in the same direction as the arms 29 and 30 and has its outer end bifurcated to receive a sleeve 34 through which the rod 31 passes. Links 35 have their forward ends connected with the sleeve 34 and their rear ends connected to other links 36 which in turn are connected to an arm 37 projecting horizontally from a vertically disposed shaft 38 formed with a crank portion 39. A pin 40 connects the meeting ends of the links 35 and 36 and passes through a cam slot 41 formed in a guide secured to or forming a part of the main frame. The cam slot 41 has a general longitudinal arrangement and is of such a shape as to insure a turning of the front wheel 26 to effect proper steering when the pin 40 is moved along the cam slot 41.

The shaft 38 may be rotated either by hand or by power derived from the motor 19. The shaft 38 is provided with a segmental gear 42 which is engaged by a worm 43 fast upon a shaft 44. For manual operation, a gear wheel 45 secured on the shaft 44 is in mesh with a gear wheel 46 secured on a shaft 47 which extends longitudinally in an upward and rearward direction and is provided at its upper rear end with a hand wheel 48 within convenient reach of the driver's seat 49. The shaft 47 is mounted to receive both a rotary and a longitudinal movement. When the shaft 47 is rotated the shaft 44 is correspondingly rotated and the front and rear wheels 26 and 5 are turned to give proper direction to the machine in turning. When steering the machine by hand the shaft 47 occupies a position with the gear wheels 45 and 46 in mesh but when it is desired to steer the machine by power the shaft 47 is moved longitudinally to throw the gear wheels 46 and 45 out of engagement and such movement of the shaft 47 is utilized for tripping the gearing whereby the steering mechanism is thrown into such a position as to be operated by the motive power of the engine.

The front wheel 26, as has been stated, is mounted for vertical adjustment and such adjustment does not interfere with the turning of the wheel. A longitudinal beam 50 constituting a lever is connected at its front end by means of a link 51 with the upper end of the standard 28. In order not to interfere with the free turning of the standard 28 the connection between such standard and the link 51 is of a swivel type and this is effected, as shown, by means of a ball and socket joint which is shown most clearly in Fig. 8, the ball member being indicated at 52 and the socket at 53. A keeper 54 is secured at one end to the arm 29 and projects over the ball member 52 so as to hold the same in the socket 53. Vertical movement of the link 51 results in a corresponding vertical adjustment of the standard 28 and the front wheel 26 and such adjustment may be effected at any time irrespective of the angular adjustment of the wheel and the wheel may be turned to the right or to the left at any vertical adjustment thereof. To secure the beam 50 in its adjusted position, a standard 55 is located near the rear end of the machine and is provided upon the face adjacent the beam with teeth 56 which are adapted to engage lateral projections on the beam, as shown in Fig. 2. A shaft 57 is disposed parallel with the standard 55 and is formed with a vertically disposed eccentric portion which is adapted to bear against the rear end of the lever or beam 50 and press the same inward to bring the lateral projections into locking engagement with the teeth 56 so as to secure the lever in the adjusted position. The shaft 57 may be turned in any manner and may be secured by suitable means in locked position. A spring finger 58 is secured at one end to a part of the shaft 57 and its opposite end portion is inclined so as to engage a cam 59 which is rotatable with pedals 60 and 61 attached to opposite ends of a sleeve 62 mounted upon a transverse shaft 63. The finger 58 tends to swing laterally so that if the cam 59 be swung forwardly, the shaft 57 will be turned to release the beam 50. After the beam 50 has been moved to the required position, rearward movement of the sleeve 62 and cam 59 brings the cam in contact with the spring finger 58, whereby the shaft 57 is turned to press the rear portion of the beam 50 into locking engagement with the teeth 56 and hold such lever in locked position.

The shaft 63 extends across the machine and is geared to a shaft 66 which is provided at its outer end with a crank 67 upon which is mounted the land wheel 68. Turning of the shaft 63 effects a corresponding turning of the shaft 66 and a relative raising or lowering of the land wheel whereby the main frame is adjusted vertically upon the land side. A lever 69 is fixed upon the shaft 63 whereby such shaft may be rotated when required to effect vertical adjustment of the land side of the machine. The lever is equipped with a latch 70 to engage a segment 71 which is loose upon the shaft 63 and connected by a rod 75 with an arm 74 on a crank shaft 72 upon which the plows are mounted so that the plows may, if required, be adjusted simultaneously with the land wheel. A rod 80 is mounted at its front end upon the crank 39 of the vertical shaft 38 and the rear end of this rod is operatively connected through intermediate devices with the crank shaft 72 whereby when the steering wheel 26 is turned to one side the plows and the land wheel will be automatically lowered.

The shaft 44 is provided at its rear end with a sprocket wheel 119 which is connected by means of a sprocket chain 120 with a sprocket pinion 121 secured to one end of a worm shaft whose worm 122 is in mesh with a gear wheel 123 connected with the sleeve 3 and frame 12 supporting the rear wheel 5. The gear wheel 123 is located about in the plane of the spindle 4 and is carried by arms which are downwardly inclined and secured at their lower ends to a hub which is secured to the lower end of the sleeve 3. In any adjusted position of the wheels 5 and 26 it will be found that a prolongation of the axis of the wheels 5, 26 and 68 will intersect and such point of intersection will coincide with the center about which the machine turns, hence the draft when turning is not in excess of that required for propelling the machine in a direct course.

A vertical shaft 125 is provided at its lower end with a gear wheel 126 which is in mesh with a pinion 127 secured to the shaft 44. A pinion 128 is secured to the upper end of the shaft 125 and a similar pinion 129 is secured near the lower end of the same. A rack bar 130 is arranged to engage the teeth of the pinion 128 and a similar rack bar 131 is disposed to engage the teeth of the pinion 129. These rack bars 130 and 131 are adapted to be positively actuated and impart a corresponding rotary movement to the shaft 125. The rack bars are disposed at opposite sides of the shaft 125 and arranged so that only one rack bar engages a pinion at a time, hence the shaft 125 is turned in one or the other direction accordingly as one or the other rack bar actuates the same. A vertically disposed shaft 132 is provided with a crank portion 133 to which the rack 131 is attached. A gear wheel 134 is secured to the upper end of the shaft 132 and has the rack bar 130 connected thereto by means of a crank pin 135. A vertical shaft is provided at its upper end with a bevel gear wheel 137 which is in mesh with a bevel gear 138 loose upon the drive shaft 11. The gear wheel 134 is a member of a train of timing gears by which the steering wheels are automatically turned to one side and the extent of such movement determined, the moving impulse being received through gears on the shaft carrying the gear wheel 137. A shaft 166 extends diagonally across the machine and terminates at a point within convenient reach of the operator's seat 49 so that said shaft may be manipulated to set the steering mechanism for automatic operation by the motive power.

Upon the drive shaft 11 is mounted a clutch member 168 which is arranged to establish operative connection between the drive shaft and the gear wheel 138. When the clutch member is clear of the gear wheel the machine may be steered by hand and the power steering mechanism is thrown out of action but when the clutch member is in engagement with the gear 138 the power steering mechanism is thrown into action to turn the machine to one side according to which of the rack bars 130 or 131 is in engagement with the coöperating gear secured to the shaft 125. A shipper lever 170 is secured at one end to a frame bar and its opposite end is forked and engages the clutch member 168. The shipper lever 170 is resilient and normally tends to hold the clutch member 168 in engagement with the gear 138, but during the final movement of the timing gearing the shipper lever 170 is pressed back to disengage the clutch and the gear to thereby throw the power steering mechanism out of action.

A shaft 174 extends transversely of the machine and is provided in its length with a crank portion 175. A collar 177 is secured upon the shaft 47 and has a stop pivoted thereto and disposed in the path of the crank portion 175 of the shaft 174. When it is required to throw the power steering mechanism into gear the shaft 47 is drawn rearward by means of a pulling force applied to the hand wheel 48. This movement brings the stop into engagement with the crank 175 and imparts a rotary movement to the shaft 174 in such a direction as to effect release of the shipper lever 170 which throws the power steering mechanism into action in the manner stated. When the shaft 47 is moved forward the stop rides over the crank portion 175 which has been returned to normal position.

The direction of the steering is controlled by the following means: The shaft 47 is provided with two stops 179 and 180. A lever 181 is pivoted between its ends upon a support 182 and is provided with two cam portions 183 and 184 which are adapted to be engaged respectively by the stops 179 and 180. When the shaft 47 is pulled rearward the stop 179 engaging the cam 183 moves the lever 181 in one direction and when the shaft 47 is pushed forward the stop 180 engaging the cam 184 moves the lever 181 in the opposite direction. A bar 185 has connection with the rack bars 130 and 131 and is adapted to positively move the same to throw one into engagement with the coöperating gear wheel and the other out of engagement with the gear wheel arranged to coöperate therewith. A link 186 is connected at one end to the bar 185 and its opposite end is adapted to be connected to the lever 181 upon one side of the fulcrum of such lever. When the link 186 is in the position indicated in Fig. 6 the rack bar 130 is in engagement with the gear 128 and the rack bar 131 is clear of the gear 129. When the link 186 is in the position indicated in Fig. 7 the rack bar 130 is clear of the gear 128 and the rack bar 131 is in engagement with the gear 129. It will thus be understood that by properly adjusting the link 186 one or the other of the rack bars may be thrown into active engagement with the shaft 125 so as to insure steering of the machine in one or the other direction.

It is to be understood that the gearing will be suitably housed as far as practicable to prevent foreign matter collecting in the teeth and also to retain lubricant and prevent the clothing or any part of the person from coming in contact with the gearing. The drive gear 8 is shown as secured to a part 187 of disk-form, such part having certain spokes of the wheel 5 attached thereto and forming an element of the housing. A part 188 is attached to the sleeve 3 and extends over the drive gear 8 and within the open portion of the part 187, thereby effectually housing the drive gear 8.

The shaft of the worm 122 is provided with a disk 189 upon which is formed a stop 190 which is adapted to engage one of a plurality of detents 191 carried by the toothed portion 123 of the frame forming a support for the drive wheel 5. The detents 191 engage the disk 189 and the stop 190 thereof so as to hold the worm 122 against accidental turning when the wheel 5 occupies a straight ahead position or is turned to the extreme right or left, as indicated by the dotted lines in Fig. 3.

Having thus described the invention, what is claimed as new is:—

1. In a machine of the character described, a main frame, front and rear wheels, an intermediate land wheel disposed constantly parallel to the longitudinal plane of the frame, the several wheels being so disposed that in any position of the front and rear wheels prolongations of the axes of all the wheels will intersect at a point coinciding with the center about which the machine is adapted to turn, and connecting means between the front and rear wheels to effect a simultaneous turning thereof in opposite directions.

2. In a machine of the character described, a steering wheel having an arm projecting laterally therefrom, a longitudinally disposed cam, a member directed in its movements by the said cam, and connecting means between such member and arm for moving the latter to turn the steering wheel.

3. In a machine of the character described, the combination of a steering wheel having an arm projecting laterally therefrom, a longitudinally disposed cam, a member mounted in such cam, connecting means between the member and arm of the steering wheel, and means for moving the member along the cam.

4. In combination, a steering wheel having a laterally extending arm, a cam guide, a member mounted in the cam guide, a link connecting such member with the lateral arm, a second link connected with the member, and means for moving the second link to shift the member along the cam guide.

5. In combination, a steering wheel having a lateral arm, a guide formed with a cam slot, a member arranged to operate in the cam slot, a link connecting the member with the arm, a second link connected with the member, and means for operating the second link to move the member along the cam slot.

6. In combination, a vertically adjustable standard provided with a steering wheel, a vertical rod paralleling the standard and connected at its ends thereto, and means having sliding connection with the rod for swinging the same in any vertical adjusted position of the standard to turn the steering wheel.

7. In combination, a vertically disposed bearing sleeve, a standard mounted in the bearing sleeve to turn and move vertically therein and provided with a steering wheel, a rod paralleling the standard and connected at its ends thereto, an arm mounted upon the bearing sleeve to turn thereon and receiving the said rod which is adapted to move freely in the outer end of the arm, and means connected with such arm to swing the rod for turning the steering wheel in the desired direction.

8. In combination, a vertically disposed bearing sleeve, a standard mounted in the sleeve to turn and move vertically therein and provided with a steering wheel, upper and lower arms fastened to the standard, a rod paralleling the standard and supported at its ends in the said arms, a sleeve mounted upon the bearing sleeve to turn thereon and provided with a laterally extending arm through which the said rod is free to move, and means connected with the last-mentioned arm and rod for swinging the latter and turning the steering wheel.

9. In combination, a standard mounted for vertical adjustment and adapted to be turned and provided with a steering wheel, a lever, and a link connected to the lever and having a swivel connection with the standard so as not to interfere with the free turning thereof.

10. In combination, a vertically disposed standard mounted to turn and adapted to be adjusted vertically and provided with a steering wheel, an operating lever, a link having pivotal connection at one end with the lever, and a ball and socket connection between such link and standard.

11. In combination, a standard mounted for vertical adjustment and provided with a supporting wheel, an operating lever having connection with the standard, a toothed standard adapted to engage the lever for holding the same in an adjusted position and means for moving the lever into engagement with the toothed standard and holding it in such position.

12. In combination, a vertically adjustable supporting wheel, a beam having connection with the supporting wheel, a vertically disposed toothed standard adapted to engage the beam and hold the same in adjusted position, and a shaft paralleling the toothed standard and having a cam portion to engage with the beam to press the same into engagement with the toothed standard and retain the same in locked position.

13. In combination, a vertically adjustable supporting wheel, a pivoted beam having connection with the supporting wheel, a vertically disposed toothed standard adapted to lockingly engage the beam, a shaft paralleling the toothed standard and having a cam portion to press the beam laterally and hold the same in locked position with the toothed standard, a projection extending from the shaft, and a cam for engaging the projection.

14. In combination, a vertically adjustable supporting wheel, a pivoted beam having connection with the supporting wheel, a vertically disposed toothed standard adapted to lockingly engage the beam, a shaft paralleling the toothed standard and having a cam portion to press the beam laterally and hold the same in locked position with the toothed standard, a spring finger connected with the shaft, and a cam adapted to coöperate with the spring finger.

15. A machine embodying a main frame including a transverse beam of substantially J-form, a supplemental frame pivotally connected to the hook member of the J-beam, and a supporting wheel mounted in the supplemental frame and movable therewith about a vertical axis.

16. A machine of the character described comprising a main frame embodying a transversely disposed beam of substantially J-form, a supplemental frame pivotally connected to the hook member of the J-beam to turn about a vertical axis, a supporting wheel mounted upon the supplemental frame, a g    element connected with the supplemen    frame, and a worm gear mounted upon the J-beam and adapted to coöperate with the gear element of the supplemental frame to effect a turning thereof.

17. In combination, a main frame, a supplemental frame pivotally connected to the main frame and adapted to turn about a vertical axis, a supporting wheel mounted upon the supplemental frame, means for turning the supplemental frame about a vertical axis, and holding means for automatically securing the supplemental frame in a predetermined adjusted position.

18. In combination, a main frame, a supplemental frame pivotally connected to the main frame to turn about a vertical axis and provided with a supporting wheel, a rotary operating member for effecting a turning of the supplemental frame and provided with an offstanding projection, and a plurality of spring detents arranged to engage the projection of the rotary operating member to hold the same and the supplemental frame in given adjusted positions.

19. In combination, a main frame, a supplemental frame embodying a vertical bearing sleeve constituting a pivotal connection between the supplemental frame and the main frame and having a spindle projecting laterally therefrom, means acting on said sleeve for turning the supplemental frame about a vertical axis, a shaft mounted in the bearing sleeve, means for imparting rotary movement to the shaft, a drive wheel mounted upon the spindle, and gearing between the drive wheel and shaft whereby rotary movement may be imparted to the drive wheel at any relative adjusted position thereof.

20. In combination, a main frame, a supplemental frame, a vertically disposed bearing sleeve constituting a pivotal connection between the supplemental frame and the main frame and having a laterally extending spindle, a shaft mounted in the bearing sleeve, means for turning the sleeve, means for applying rotary movement to the shaft at one end, a drive wheel mounted upon the spindle, and means for transmitting movement from the opposite end of the shaft to the drive wheel.

21. In combination, a main frame, a vertically disposed bearing sleeve having a laterally extending spindle and pivotally connected with the main frame to turn about a vertical axis, a supplemental frame of U shape having connection at one end with the bearing sleeve and at its opposite end with the outer extremity of the spindle, a drive wheel mounted upon the spindle, a vertical shaft mounted in the bearing sleeve, means for imparting rotary movement to the shaft, and gearing between the shaft and drive wheel.

22. In a machine of the character described embodying steering wheels, steering mechanism for the steering wheels, and means under control of the operator for throwing the steering mechanism into active position to effect steering to the right or left, the same including movable rack bars and coöperating gears, and means for moving the rack bars to throw one into operative position and the other out of operative position.

23. In combination, a main frame mounted upon wheels and including a steering mechanism which embodies movable rack bars and coöperating gears, a connection between the rack bars whereby one of such rack bars may be thrown into engagement with its coöperating gear and the other rack bar moved clear of the gear with which it coacts, a pivoted member, means for connecting the rack bars connection with the pivoted member upon either side of its fulcrum, and means under control of the operator for actuating the pivoted member to throw one or the other rack bar into operative position according to the required direction of steering.

24. In combination, a main frame mounted upon supporting wheels, a steering mechanism including rack bars and coöperating gears, means connecting the rack bars, a pivoted member having cam portions upon opposite sides of its fulcrum, means for connecting either end of the pivoted member with the rack bar connecting means, a rectilineally movable member and stops mounted upon such member and adapted to engage the pivoted member for positively moving the same and the rack bars whereby one or the other of the rack bars is thrown into active position according to the direction of steering.

25. In combination, a main frame, supporting wheels therefor, a steering mechanism including rack bars and coöperating gears, means connecting the rack bars, a longitudinally movable member, stops mounted upon such member, a pivoted member having cam portions upon opposite sides of its fulcrum to be engaged by the stops of the longitudinally operable member, and means for connecting the rack bars connecting means with either end of the pivoted member to admit of either one of the rack bars being thrown into operative position.

26. In combination, a main frame, supporting wheels therefor, a power shaft, a second shaft, rack bars having crank connection with the second shaft, coöperating gears for the rack bars, a steering shaft geared to the coöperating gears, means under control of the operator for throwing one or the other of the rack bars into engagement with its coöperating gear, and other means under control of the operator for throwing the power shaft into clutched engagement.

In testimony whereof I affix my signature in presence of two witnesses.

ALEXANDER McCREREY. [L. S.]

Witnesses:
E. W. SCHOFIELD,
S. D. MOSER.